United States Patent [19]

Stransky et al.

[11] Patent Number: 5,054,286
[45] Date of Patent: Oct. 8, 1991

[54] BYPASS VALVE SYSTEM

[75] Inventors: Larry W. Stransky, West Chester; Valentine R. Boehm, Jr.; Michael A. Phillips, both of Cincinnati; Edward W. Ryan, Mason, all of Ohio.

[73] Assignee: General Electric Company, Cincinnati, Ohio

[21] Appl. No.: 653,740

[22] Filed: Feb. 11, 1991

Related U.S. Application Data

[63] Continuation of Ser. No. 546,219, Jun. 29, 1990, abandoned.

[51] Int. Cl.⁵ ............................................. F02K 3/02
[52] U.S. Cl. .................................. 60/226.3; 137/15.1
[58] Field of Search .............. 137/15.1, 15.2; 60/226, 60/226.3

[56] References Cited

U.S. PATENT DOCUMENTS

| | | | |
|---|---|---|---|
| 3,011,307 | 12/1961 | Edelfelt | 137/15.1 |
| 4,012,165 | 3/1977 | Kraig | 60/226 |
| 4,054,030 | 10/1977 | Pedersen | 60/262 |
| 4,064,692 | 12/1977 | Johnson et al. | 60/261 |
| 4,068,471 | 1/1978 | Simmons | 60/262 |
| 4,069,661 | 1/1978 | Rundell et al. | 60/204 |
| 4,072,008 | 2/1978 | Kenworthy et al. | 60/261 |
| 4,085,583 | 4/1978 | Klees | 60/204 |
| 4,151,714 | 5/1979 | Scrace | 60/226 B |
| 4,175,384 | 11/1979 | Wagenknecht et al. | 60/226 B |
| 4,222,233 | 9/1980 | Johnson et al. | 60/225 |
| 4,261,686 | 4/1981 | Weiler | 415/151 |
| 4,294,068 | 10/1981 | Klees | 60/204 |
| 4,390,318 | 6/1983 | Weiler | 415/145 |
| 4,409,788 | 10/1983 | Nash et al. | 60/226.3 |
| 4,813,229 | 3/1989 | Simmons | 60/204 |

*Primary Examiner*—Alan Cohan
*Attorney, Agent, or Firm*—Jerome C. Squillaro

[57] ABSTRACT

A bypass valve system includes an annular frame defining a cavity and having an intermediate casing with an annular opening including a plurality of bypass valve doors disposed therein. An annular actuation ring is disposed in the frame cavity and a plurality of space links is pivotally connected between the ring and the bypass valve doors. Each of the space links includes a longitudinal axis and means are provided for rotating the actuation ring between a first position wherein each link longitudinal axis has a first inclination angle and the doors are in a first position, and a ring second position wherein the space link longitudinal axis has a second inclination angle less than the first inclination angle so that the links pivot the doors about a door first end to position the door in a door second position.

37 Claims, 7 Drawing Sheets

Fig. 17.
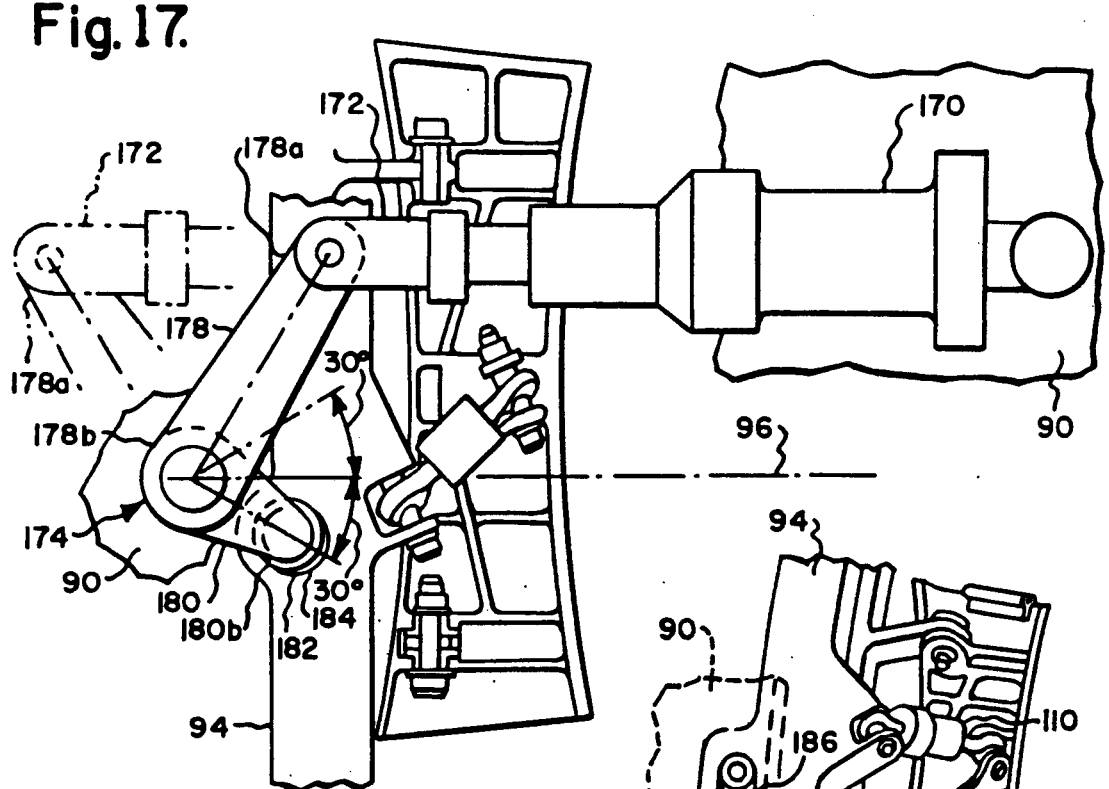
Fig. 18.
Fig. 16.
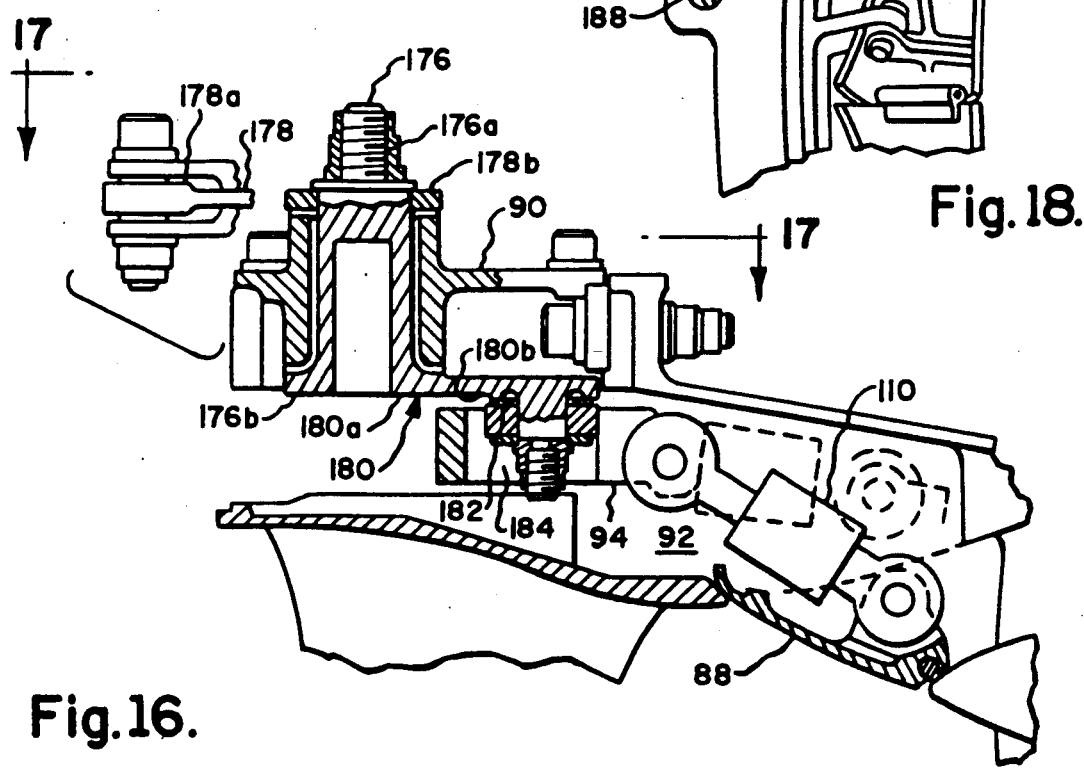

BYPASS VALVE SYSTEM

This invention was made with Government support under Contract F33657-83-C-0281 awarded by the Department of the Air Force. The Government has certain rights in this invention.

CROSS-REFERENCE TO RELATED APPLICATION

This application is a Continuation of application Ser. No. 07/546,219, filed June 29, 1990 now abandoned.

This application is related to application Ser. No. 546,229 filed concurrently herewith and entitled "Bypass Valve Door".

TECHNICAL FIELD

The present invention relates generally to gas turbine engines, and, more specifically, to an improved bypass valve system.

BACKGROUND ART

A conventional variable cycle gas turbofan engine includes a core engine driving a fan, and a bypass duct surrounding the core engine which is in flow communication with the fan. A conventional bypass valve is disposed at an upstream, inlet end of the bypass duct and is positionable in a closed position which substantially block flow from the fan into the bypass duct under certain conditions in the flight envelope of an aircraft being powered by the engine while allowing flow from the fan to be channeled into the core engine. The bypass valve is also positionable in an open position which allows substantially unobstructed flow from the fan into the bypass duct for bypassing a portion of the fan air around the core engine while allowing the remaining portion of the fan air to be channeled through the core engine during operation of the aircraft at other conditions in the flight envelope.

Conventional bypass valve assemblies are relatively complex and are controlled in accordance with predetermined schedules corresponding to operation in the flight envelope of the aircraft. An exemplary conventional bypass valve assembly includes an annular ring valve which is translatable to open and close an annular inlet to the bypass duct. Conventional linkages and servovalves are used to translate the valve and are operatively connected to the control system of the engine for being responsive to the predetermined schedules contained in the control system for opening and closing the bypass valve at various conditions in the flight envelope.

In the open position, the bypass valve must provide for substantially unobstructed flow into the bypass duct for reducing or minimizing pressure losses therefrom which would decrease performance of the engine and reduce the cooling ability of the bypass air channeled in the bypass duct. The bypass air is typically used to improve cruise SFC and to cool downstream structures in the engine, such as, for example, a conventional augmentor and variable area exhaust nozzle, and any pressure losses due to the bypass duct would have to be accommodated, typically by increasing pressure in the bypass duct which decreases engine performance. Furthermore, the bypass valve must also provide for substantially unobstructed flow and smooth transition into the bypass duct to prevent or minimize any backpressure on the fan which would undesirably reduce stall margin of the fan.

The bypass valve in the form of a mode selector valve is typically positioned between a fully open position and a fully closed position for double or single bypass operation of an exemplary double bypass engine. In alternate embodiments, the bypass valve may additionally be disposed at intermediate positions therebetween, as required by particular aircraft engine applications. In this way, the bypass ratio conventionally represented by the total engine airflow divided by the core engine airflow may be varied during operation of the aircraft engine.

A significant problem associated with the variable geometry required for positioning bypass valves is the availability of mounting space, and correspondingly, the amount of allowable weight for the bypass valve system. Typically, little axial and radial envelope is available in conventional augmented turbofan engines due to the close proximity between the fan, compressor rotors, and external gear box for the bypass valve system. Without available space, the engine must be redesigned for having a larger diameter and longer axial length for accommodating the required bypass valve system. Increased radial and axial size of a gas turbine engine and the corresponding increase in weight, is undesirable since it leads to additional weight and penalty losses for the overall engine.

Furthermore, conventional bypass valve systems typically require rigging, or adjustments at assembly to ensure coordinated movement and full travel of parts. Rigging increases assembly time and costs associated therewith.

OBJECTS OF THE INVENTION

Accordingly, one object of the present invention is to provide a new and improved bypass valve system.

Another object of the present invention is to provide a bypass valve system which is relatively compact and lightweight.

Another object of the present invention is to provide a bypass valve system having an improved actuation system requiring relatively few parts.

Another object of the present invention is to provide a bypass valve system having an actuating system requiring relatively little space for positioning a bypass valve between opened and closed positions.

Another object of the present invention is to provide a bypass valve system including an improved bypass valve door which is positionable in an open position for providing a smooth fluid boundary with minimal aerodynamic losses therefrom.

Another object of the present invention is to provide a bypass valve assembly having reduced, or eliminated rigging.

DISCLOSURE OF INVENTION

A bypass valve system includes an annular frame defining a cavity and having an intermediate casing with an annular opening including a plurality of bypass valve doors disposed therein. An annular actuation ring is disposed in the frame cavity and a plurality of space links are pivotally connected between the ring and the bypass valve doors. Each of the space links includes a longitudinal axis and means are provided for rotating the actuation ring between a first position wherein each link longitudinal axis has a first inclination angle and the doors are in a first position, and a ring second position wherein the space link longitudinal axis has a second inclination angle less than the first inclination angle so that the links pivot the doors about a door first end to position the door in a door second position.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawing in which:

FIG. 16 is a transverse sectional view of a bypass valve system in accordance with a second embodiment of the present invention.

FIG. 17 is a top view of a portion of the bypass valve system illustrated in FIG. 16 taken along line 17—17.

FIG. 18 is a perspective view of a portion of the second embodiment of the bypass valve system showing a second embodiment of the actuation ring joined to a respective bypass valve door.

MODE(S) FOR CARRYING OUT THE INVENTION

Figure 1:
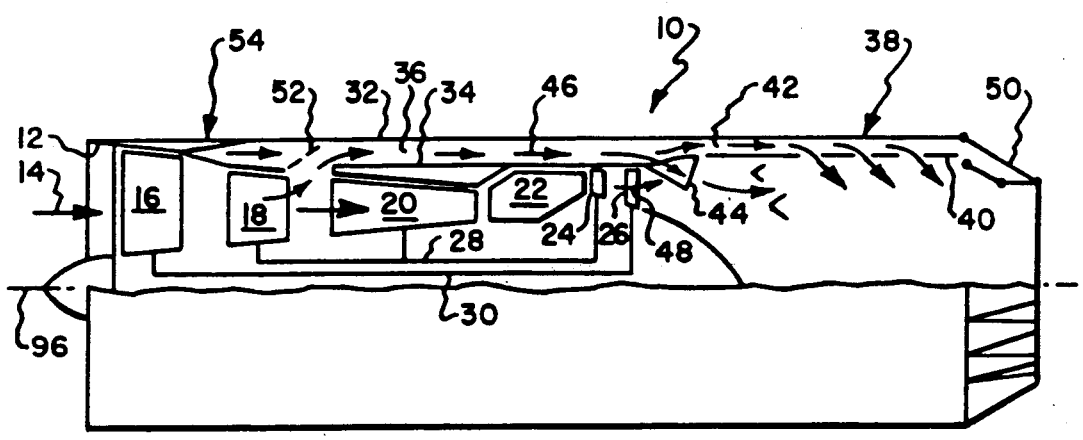
FIG. 1 is a schematic representation of an augmented, variable cycle, gas turbine turbofan engine for powering an aircraft which includes a bypass valve system in accordance with one embodiment of the present invention.

Illustrated in FIG. 1 is a schematic representation of an exemplary variable cycle gas turbine turbofan engine 10 for powering an aircraft in a flight envelope including subsonic and supersonic speeds at various altitudes. The engine 10 includes an annular inlet 12 for receiving ambient air 14 followed in turn by a conventional forward fan 16, aft fan 18, or low pressure compressor, high pressure compressor (HPC) 20, combustor 22, high pressure turbine (HPT) 24, and low pressure turbine (LPT) 26. The HPT 24 powers both the aft fan 18 and the HPC 20 through a conventional first shaft 28. The LPT 26 powers the forward fan 16 by a conventional second shaft 30.

The engine 10 further includes an outer casing 32 which is spaced from an inner casing 34 to define a conventional bypass duct 36 therebetween. Extending downstream from the outer casing 32 and the LPT 26 is a conventional afterburner, or augmentor, 38 which includes a conventional liner 40 surrounded by a conventional annular afterburner duct 42.

The afterburner duct 42 is in flow communication with the bypass duct 36 and a conventional mixer 44 is disposed therebetween for mixing a portion of bypass air 46 channeled through the bypass duct 36 with combustion discharge gases 48 discharged from the LPT 26, which are channeled into the afterburner 38 and discharged through a conventional variable area nozzle 50 disposed at the downstream end of the afterburner 38.

In this exemplary embodiment, the engine 10 is a double bypass engine including an optional, conventional valve 52 disposed in the inner casing 34 between the aft fan 18 and the HPC 20 for channeling into the bypass duct 36 a portion of the air 14 which flows through the aft fan 18 during certain operation of the engine. The valve 52 may be conventionally open or closed as desired or, in another embodiment, the valve 52 may be omitted which allows continuous flow of a portion of the air 14 from between the aft fan 18 and the HPC 20 into the bypass duct 36.

Figure 2:
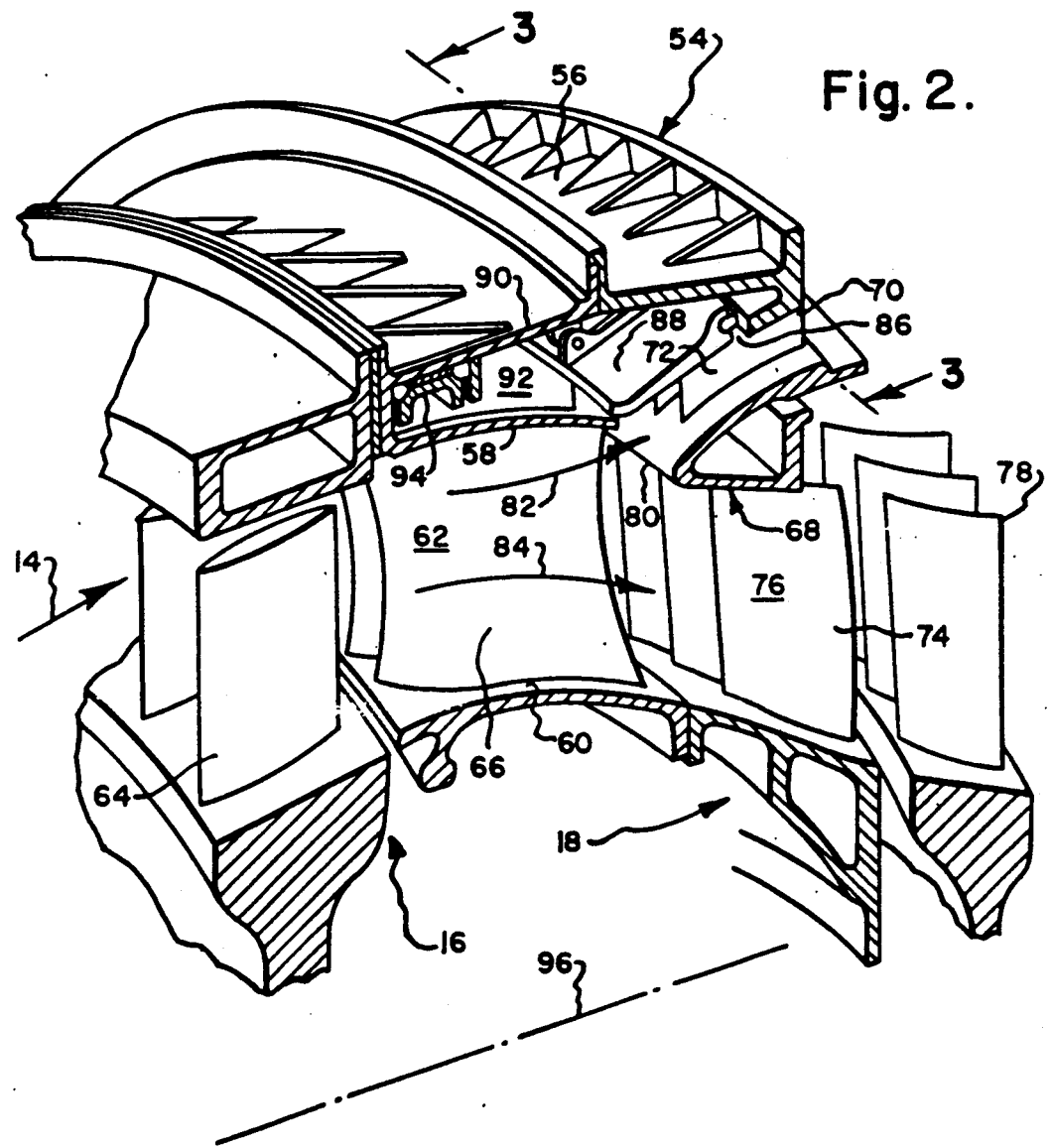
FIG. 2 is a perspective schematic representation of a portion of the bypass valve system illustrated in FIG. 1.

The engine 10 is conventional except for a bypass valve system 54 in accordance with a preferred, exemplary embodiment of the invention disposed between the forward fan 16 and the aft fan 18. Illustrated in FIG. 2 is the bypass valve system 54 shown in more particularity. The system 54 includes an annular fan frame 56 having an intermediate casing 58 and an inner casing 60 spaced radially inwardly from the inner casing 58 to define a first channel 62 for channeling the air 14. The forward fan 16 includes a plurality of conventional fan blades 64 which are conventionally connected to the second shaft 30, and a plurality of conventional fan outlet guide vanes (OGVs) 66 which are disposed in the first channel 62 for supporting the inner casing 60 to the intermediate casing 58 and for channeling the air 14.

A conventional annular flow splitter 68 is conventionally fixedly disposed between the intermediate and inner casings 58 and 60 by a plurality of circumferentially spaced struts 70 extending between the intermediate casing 58 and the splitter 68 which casing and splitter define a second flow channel 72, or inlet to the bypass duct 36. The splitter 68 is conventionally connected to the inner casing 60 by a plurality of circumferentially spaced conventional inlet guide vanes (IGVs) 74 which define therebetween a third flow channel 76, or inlet to the core engine. The aft fan 18 of the core engine includes the IGVs 74 and a plurality of conventional, circumferentially spaced blades 78 conventionally operatively connected to the first shaft 28. The splitter 68 includes a leading edge 80 which splits the air 14 into a bypass airflow 82 which is channeled into the second channel 72, and a core airflow 84 which is channeled into the third channel 76.

The assembly 54 further includes an annular opening 86 in the intermediate casing 58 facing the splitter 68. Disposed in the annular opening 86 is a plurality of circumferentially juxtaposed bypass valve doors 88. In an exemplary embodiment, there are 12 doors 88 disposed over the 360° circumferential extent of the opening 86.

Figure 3:
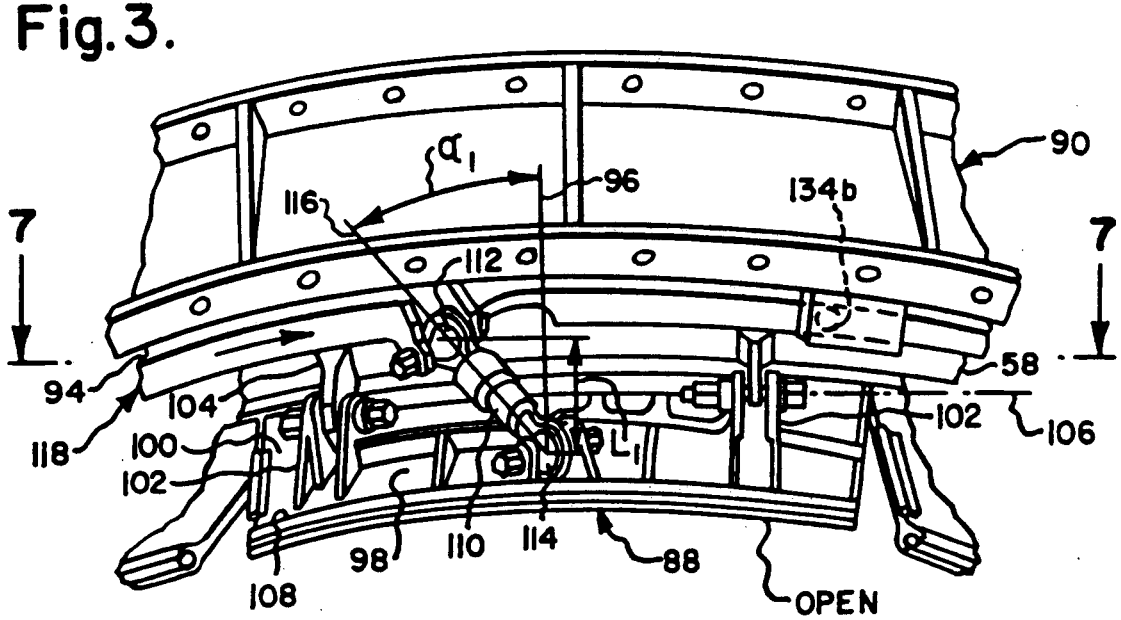
FIG. 3 is an upstream facing, perspective view of a portion of the bypass valve system illustrated in FIG. 2 taken along line 3—3 illustrating bypass valve doors in an open position.

The frame 56 further includes an outer casing 90 spaced radially outwardly from the intermediate casing 58 to define a cavity 92 therebetween. An annular actuation ring 94 is disposed in the cavity 92 coaxially about a longitudinal centerline axis 96 of the frame 56, and of the engine 10. As illustrated in FIG. 3, each of the doors 88 includes an outer surface 98 and an upstream, first end 100 pivotally connected to the frame 56. More specifically, formed integrally to the door outer surface 98 at the upstream end 100 is a pair of circumferentially spaced clevises 102, each of which is pivotally connected to a hinge support 104, for example by a bolt extending through the hinge support and the clevis, with the hinge support being fixedly connected to the intermediate casing 58. Conventional composite bushings, such as for example Avimid N bushings available from Tribon Bearing Company, may be disposed between the bolts and the complementary apertures in the clevises 102 and the hinge support 104 for reducing friction as the door 88 rotates relative to the hinge support 104. A straight hinge axis 106 extends through the centers of the bolts in the clevises 102 for defining an axis about which the doors 88 are pivotable. Each of the doors 88 further includes a downstream, or second end 108.

Figure 5:
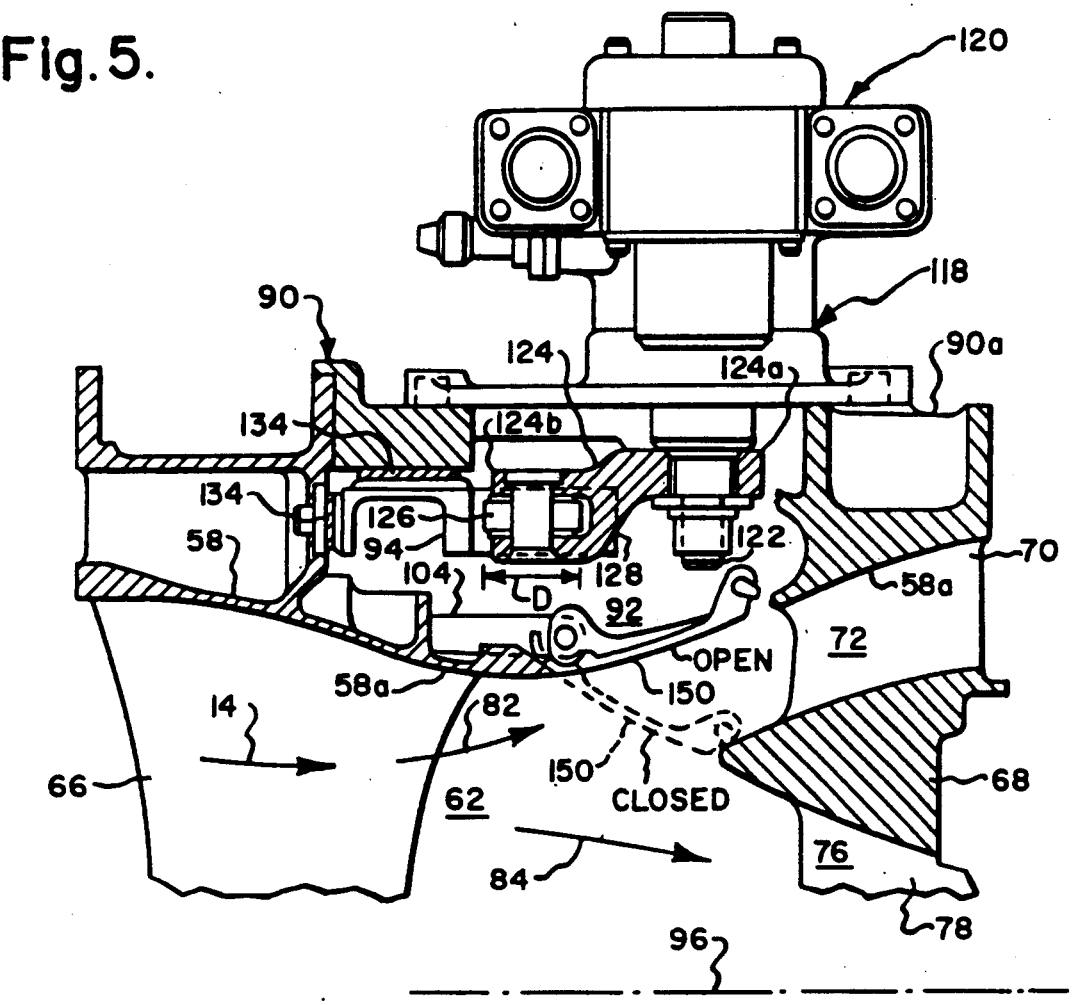
FIG. 5 is a transverse sectional view of a portion of the bypass valve system illustrated in FIG. 2 showing means for actuating the bypass valve doors therein.

The doors 88 are positionable in a first, or open position, as illustrated in solid line in FIG. 5, which is generally parallel to the intermediate casing 58 to allow substantially unobstructed flow of the bypass airflow 82 into and through the second channel 72. The doors 88 are also positionable in a second, or closed position, as illustrated in dashed line in FIG. 5, wherein the door downstream end 108 is disposed adjacent to the splitter 68 for substantially blocking the bypass airflow 82 from the first channel 62 to prevent its passage into the second channel 72 while allowing substantially all of the air 14 to enter the core engine through the third channel 76 as core airflow 84.

The system 54 further includes a plurality of space links 11) as illustrated in FIG. 3, each having a first, upstream end 112 pivotally connected to the ring 94, and second, downstream end 114 pivotally connected to a respective one of the doors 88. In this exemplary embodiment, there are twelve space links 110 associated with the respective twelve doors 88. The space link 110 also includes a centerline longitudinal axis 116 extending from the first end 112 to the second end 114. Means 118 are provided for rotating the actuation ring 9 between a ring first position and a ring second position. The ring first position corresponds to the door first position, wherein each link longitudinal axis 116 has a first circumferential inclination angle $\alpha_1$ relative to the axis 96 and the door 88 is in the door open position as illustrated for example in FIG. 3. The ring second position corresponds with the door second position wherein the link longitudinal axis 116 has a second circumferential inclination angle $\alpha_2$ relative to the axis 96 which is less than the first inclination angle $\alpha_1$ so that the link 88 pivots the door 88 about the door upstream end 100 and about the hinge axis 106 to position the door 88 in the door closed position as illustrated for example in FIG. 4.

Figure 4:
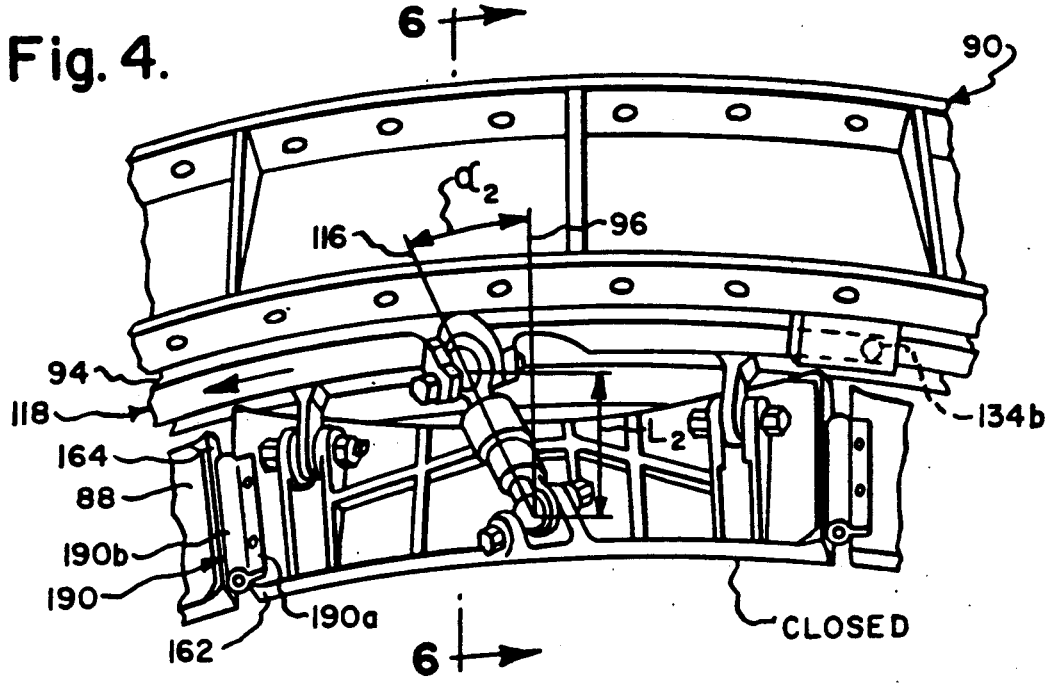
FIG. 4 is a view of the portion of the bypass valve system illustrated in FIG. 3 showing the bypass valve doors in a closed position.
Figure 6:
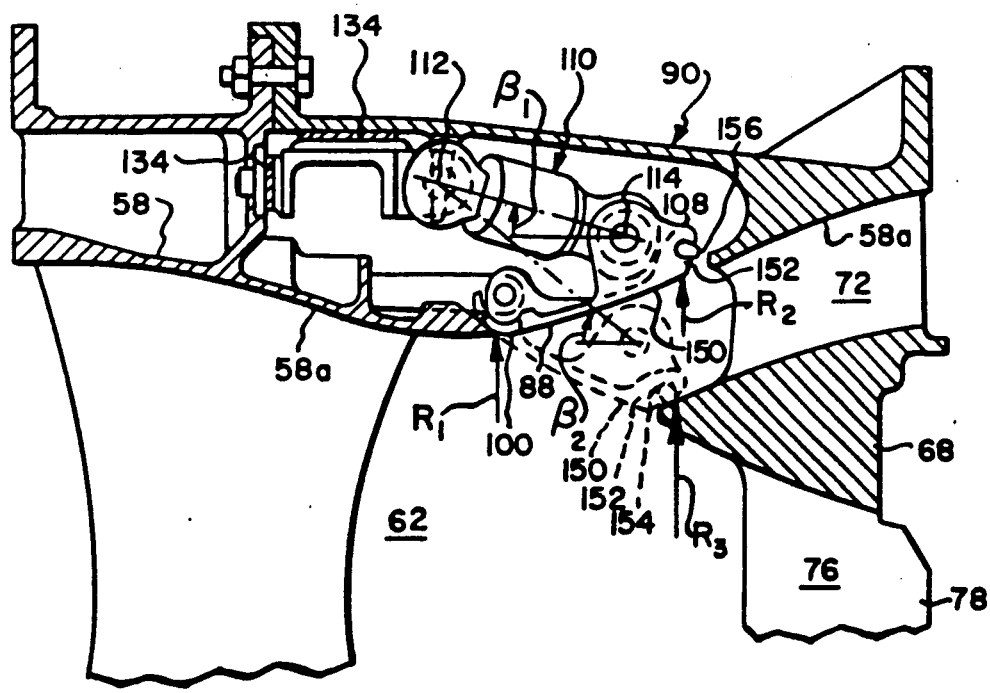
FIG. 6 is a transverse sectional view of the bypass valve system illustrated in FIG. 3 taken along the line 6—6.

As illustrated in FIG. 3, the link longitudinal axis 116 has a first projected axial length $L_1$ between its upstream and downstream ends 112 and 114 relative to the frame centerline axis 96 in the door open position. As illustrated in FIG. 4, the link longitudinal axis 116 has a second projected axial length $L_2$ relative to the frame centerline axis 96 in the door closed position. Each of the links 110 is predeterminedly positioned between the ring 94 and the doors 88 so that the second inclination angle $\alpha_2$ is less than the first inclination angle $\alpha_1$ for obtaining an increase in projected axial length, $L_2$ being greater than $L_1$, to push each of the doors 88 for rotating the doors 88 about the hinge axis 106 to the closed position. Since the axial projected length $L_2$ is greater than $L_1$ and the ring 94 does not translate in the axial direction, then the link second ends 114 must move in a downstream direction thereby rotating the doors 88 about the hinge axis 106 for positioning the doors 88 in the closed position. As illustrated in FIG. 6, each of the links 110 is also positioned at a first radial inclination angle $\beta_1$, which represents the inclination of the link longitudinal axis 116 relative to the frame centerline axis 96 in the radial direction when the door 88 is in the open position. When the door 88 is disposed in the closed position, the link longitudinal axis 116 is disposed at a second radial inclination angle $\beta_2$ which is larger than the first radial inclination angle $\beta_1$. In the preferred embodiment, the link longitudinal axis 116 is initially inclined radially inwardly from the ring 94 toward the doors 88 for improving the mechanical transfer of actuation forces for closing the doors 88.

In the preferred embodiment of the present invention, the first circumferential inclination angle $\alpha_1$ is about 50°, the second circumferential inclination angle $\alpha_2$ is about 0°, the first radial inclination angle $\beta_1$ is about 17°, and the second radial inclination angle $\beta_2$ is about 41°. Although the two angles ($\alpha$ and $\beta$) are used herein to describe the angular position of the link 110, the position could also be described by other angular conventions including a single angle representing a resultant of the two angles. In all cases, however, the projected length of the link 110 is used to describe its relative increase in length between the ring 94 and the door 88 for closing the door 88, and relative decrease in length to open the door 88.

About 3° of rotation of the actuation ring 94 relative to the frame centerline axis 96 (e.g., clockwise) results in about 45° of rotation of each of the doors 88 about the hinge axis 106 from the open to the closed door positions. Correspondingly, rotating the ring 94 counterclockwise for about 3° will position the doors 88 in the closed position illustrated in FIG. 4 to the open position illustrated in FIG. 3. Accordingly, pivoting of the doors 88 about the hinge axis 106 by rotation of the actuation ring 94 is controllable by the size and positioning of the ring 94, space links 110 and the doors 88. One skilled in the art may vary the size and position of these elements for varying the amount of the full rotational travel of the doors 88 about the hinge axis 106 and the corresponding rotation of the actuation ring 94 as desired.

Figure 7:
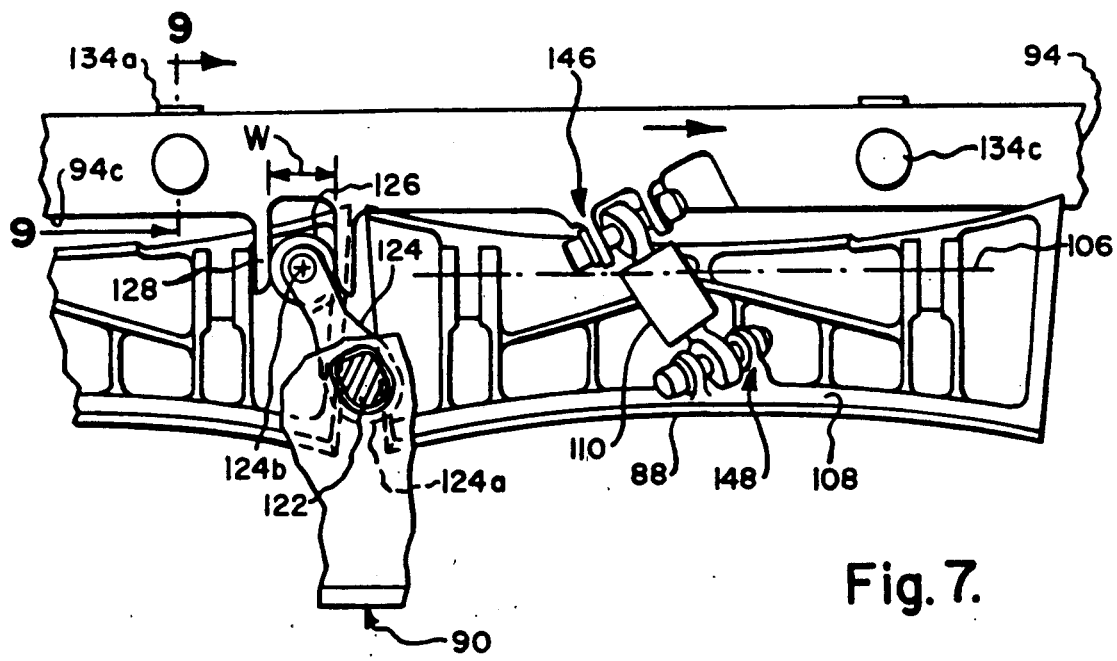
FIG. 7 is a top view of a portion of the bypass valve system illustrated in FIG. 3 taken along line 7—7 illustrating the bypass valve doors in the open position.
Figure 8:
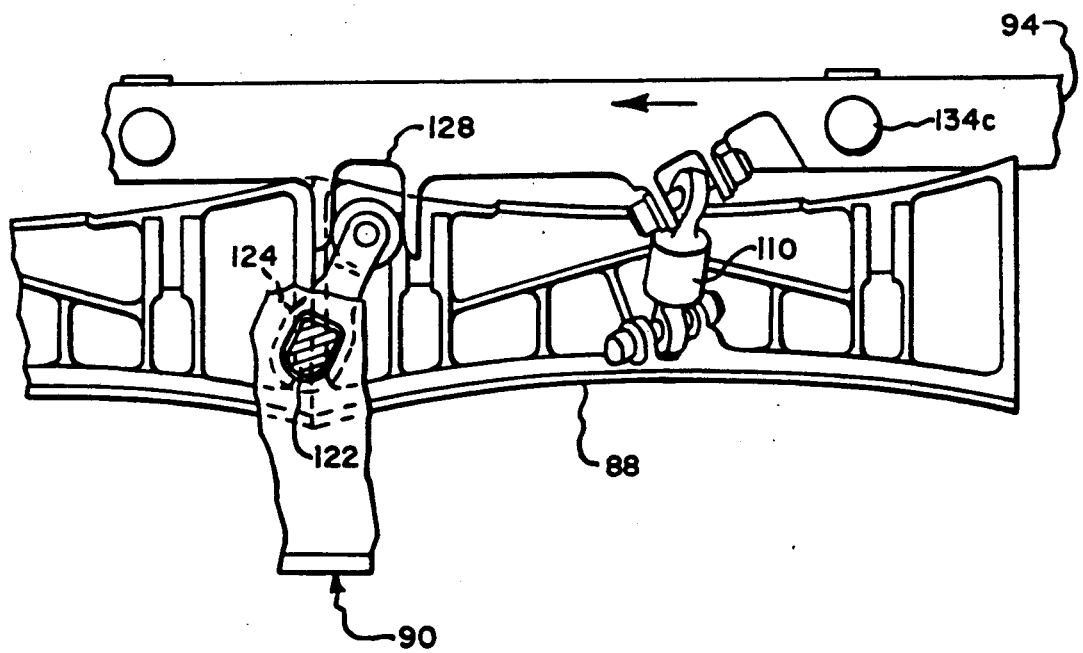
FIG. 8 is a top view of the bypass valve system illustrated in FIG. 4, similar to the view illustrated in FIG. 7, showing the bypass valve doors in the closed position.

Referring for example to FIGS. 5, 7 and 8, the rotating means 118 preferably includes a single conventional rotary actuator 120 for minimizing complexity, weight and space requirements. The rotary actuator 120 is conventionally fixedly secured to an outer surface 90a of the outer casing 90 by bolting for example. The actuator 120 has a rotatable actuator rod 122 extending through a complementary aperture through the outer casing 90 and into the cavity 92. A conventional crankarm 124 has a first end 124a fixedly connected to the actuator rod 122, by a nut for example, for rotation therewith, and a second end 124b pivotally connected to the ring 94. A conventional roller bearing 126 is pivotally connected to the crankarm second end 124b which allows the roller bearing 126 to rotate relative thereto.

The ring 94 includes a generally U-shaped slot 128 extending parallel to the axis 96 and generally parallel to the crankarm second end 124b and has a width W, as illustrated in FIG. 7, which is complementary to an outer diameter D of the bearing 126, as illustrated in FIG. 5, with the roller bearing 126 being positioned in the slot 128. Upon rotation of the crankarm 124 the roller bearing 126 imparts a force to the ring 94 through the slot 128 in a circumferential direction for rotating the ring 94 while rolling axially in the slot 128. FIGS. 3 and 7 show the doors 88 in the open position and the ring 94 in its respective first position. The ring 94 is rotatable clockwise to its second position illustrated in FIGS. 4 and 8 for positioning the doors 88 in the closed position. In the preferred embodiment, the angular rotation of the ring 94 from its first position to its second position, e.g., FIGS. 7 and 8, is about 3°. The ring 94 may then be rotated counterclockwise from its second position illustrated in FIGS. 4 and 8 to its first position as illustrated in FIGS. 3 and 7 to reopen the doors 88. Accordingly, the actuator 120 is effective for rotating the actuation rod 122 and the crankarm 124 either clockwise or counterclockwise for rotating the ring 94 between the ring first and second positions for placing the doors 88 in their corresponding open and closed positions.

Figure 9:
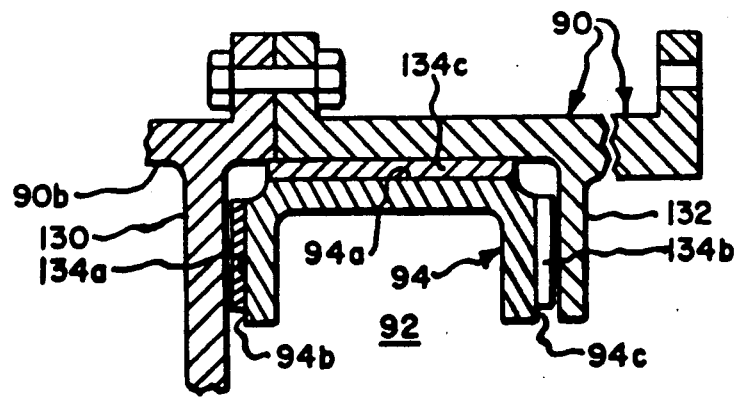
FIG. 9 is a transverse sectional view of the actuation ring used in the bypass valve system illustrated in FIG. 7 taken along line 9—9.

The rotating means 118 further includes the ring 94 being rotatably and slideably disposed in the frame 56 and axially restrained therein for preventing translation of the ring 94 in the axial direction parallel to the frame centerline axis 96 as illustrated for example in FIGS. 5, 6 and 9. More specifically, the ring 94 is preferably U-shaped for reducing weight and includes an annular radially outer surface 94a, an annular first, or upstream, side surface 94b and an annular second, or downstream, side surface 94c. The frame 58 further includes an annular first, or upstream, flange 130 fixedly connected to an inner surface 90b of the outer casing 90 in the cavity 92, and a plurality of equiangularly and circumferentially spaced second flanges 132 fixedly connected to the outer casing inner surface 90b in the cavity 92 and spaced axially downstream from the first flange 130. The ring 94 is preferably sized with an outer diameter and width so that it is positioned between the first and second flanges 130 and 132 and adjacent to the outer casing 90 in sliding contact therewith for allowing rotation of the ring 94 while restraining axial translation of the ring 94. By being so trapped between the first and second flanges 130 and 132, the ring may rotate without axial translation.

In order to minimize friction between the ring 94 and the first and second flanges 130 and 132 and the outer casing inner surface 90b, a low friction material is preferably positioned between the ring 94 and these elements. As illustrated for example in FIGS. 3, 7 and 9, the low friction material may be provided in the form of a plurality of conventional rub buttons 134 disposed between the ring 94 and at least one of the first and second flanges 130 and 132 and the outer casing surface 90b for reducing friction against the ring 94. In the preferred embodiment, the rub buttons 134 are circular and include a plurality of circumferentially spaced first rub buttons 134a fixedly attached to the ring first side surface 94b for contacting the frame first flange 130, a plurality of circumferentially spaced second rub buttons 134b fixedly attached to the ring second side surface 94c for contacting the frame second flange 132, and a plurality of circumferentially spaced third rub buttons 134c fixedly attached to the ring outer surface 94a for L contacting the outer casing inner surface 90b. In the preferred embodiment, there are six first rub buttons 134a, six second rub buttons 134b, and twelve third rub buttons 134c. The rub buttons are made from commercially available Avimid N available from Tribon Bearing Company, which provides for relatively low friction forces and is stable at temperatures up to about 350° C. The rub buttons include a conventional tubular portion having tabs which are disposed through a complementary hole in the ring 94 for mechanically interlocking the buttons 134 to the ring 94 (not shown).

Figure 10:
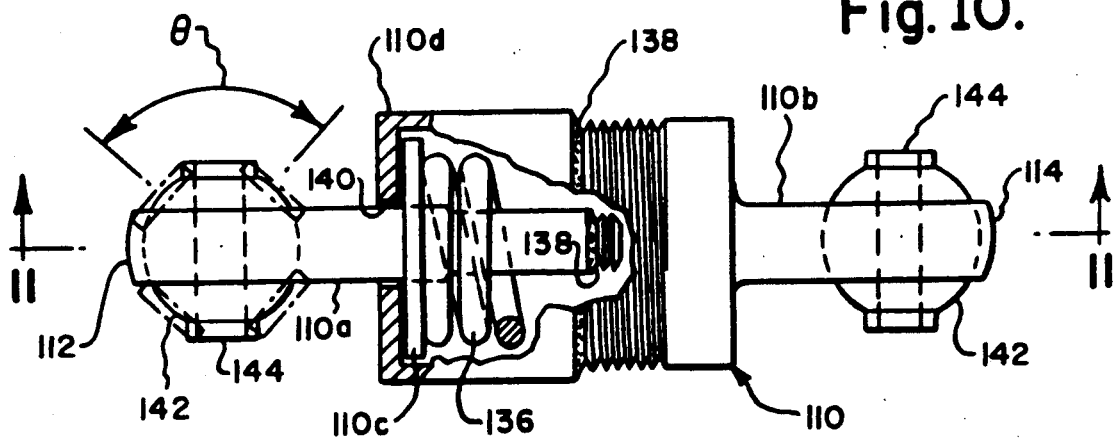
FIG. 10 is a top, partly sectional view of one of the space links used in the bypass valve system illustrated for example in FIGS. 3 and 4.
Figure 11:
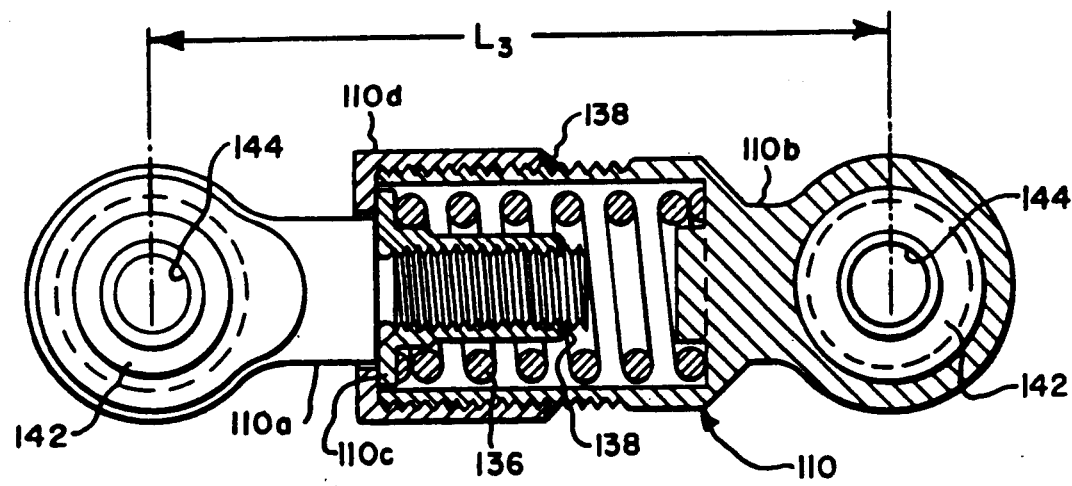
FIG. 11 is a transverse sectional view of the space link illustrated in FIG. 10 taken along the plane defined by line 11—11.
Figure 12:
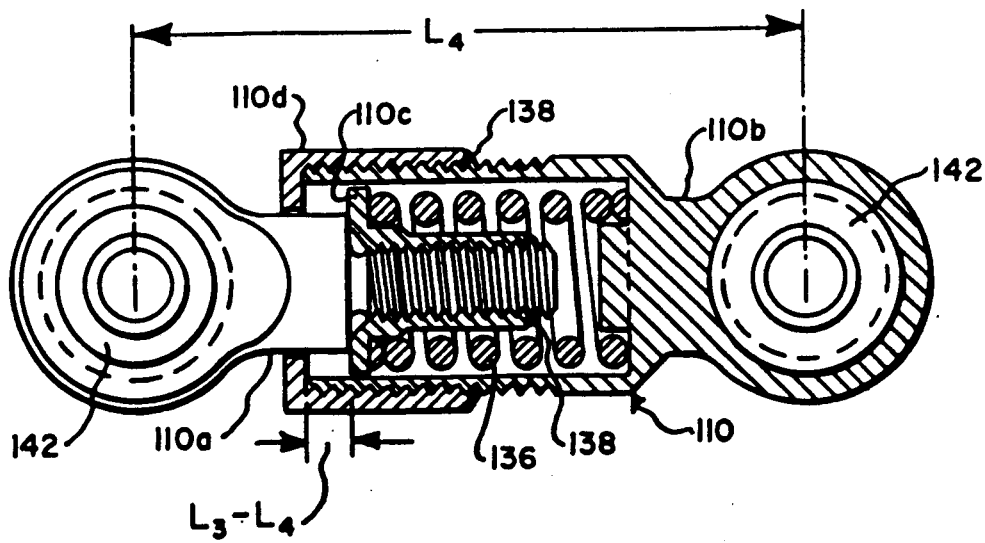
FIG. 12 is a transverse sectional view of the space link illustrated in FIG. 11 shown in a compressed position.

As illustrated for example in FIGS. 10, 11 and 12, each of the space links 110 is preferably compressible for eliminating the need for rigging, i.e., tailoring of the length of the space links 110 during assembly, so that when the doors 88 are in the closed position, at least one, or each of the space links 110 is slightly compressed between the ring 94 and a respective one of the doors 88 for ensuring that the closed position is fully closed. One means for obtaining compression capability of the space links 110 is to form the space links 110 with a male end 110a, a female end 110b and a compression spring 136 disposed therebetween so that movement of the male end 110a relative to and toward the female end 110b compresses the spring 136.

Each space link in the form of a spring link 110 also includes an annular base plate 110c fixedly attached to the male end 110a, and the spring 136 is positioned between the base plate 110c and the female end 110b so that movement of the base plate 110c relative to the female end 110b compresses the spring 136. The base plate 110c is preferably internally threaded, and the male end 110a is preferably externally threaded so that the base plate 110c may be initially threaded to the male end 110a. A tack weld 138 is preferably used to fixedly join the base plate 110c threaded to the male end 110a to prevent unthreading.

An annular retention cap 110d having a central opening 140 is disposed around the male end 110a before the base plate 110c is attached to the male end 110a during assembly. The spring link 110 is assembled by firstly positioning the retention cap 110d over the male end 110a and then positioning and securing the base plate 110c to the male end 110a. The spring 136 is positioned between the base plate 110c and the female end 110b and the cap 110d is preferably threaded onto the female end 110b. The retention cap 110d in the preferred embodiment includes internal threads which are complementary to external threads on the female end 110b so that these two elements may be fixed together. The base plate 110c is larger than the central opening 140 so that as the cap 110d is threaded onto the female end 110b during assembly, the retention cap 110d pushes against base plate 110c for predeterminedly initially compressing the spring 136 against the female end 110b. Another tack weld 138 may then be used to fixedly connect the retention cap 110d to the female end 110b to prevent separation during operation. The retention cap 110d also encases the spring 136 and prevents debris from entering the spring chamber formed between the retention cap 110d and the female end 110b.

The base plate 110c is positioned between the retention cap central opening 140 and the female end 110b so that the spring link 110 is unextendable when the base plate 110c contacts the retention cap 110d.

The space link first and second ends 112 and 114 include conventional rotatable uniballs 142 which are simply conventional spherical rod ends. The uniballs 142 each have a central bore 144 for being connected to the actuation ring 94 and the door 88 by a bolt extending therethrough. The uniballs 142 have a diameter sized relative to the width of the link first and second ends 112 and 114 for allowing the uniball to be pivotal over an angular range $\theta$ of up to about 52°.

As illustrated in FIG. 11, the spring link 110 has an uncompressed first position represented by a length $L_3$ between the central bores 144 and is unextendable in that first position, and is compressible from the first position to a compressed second position as illustrated in FIG. 12 and as represented by a compressed length $L_4$, which is smaller than the uncompressed length $L_3$, with the difference representing $L_3-L_4$. In the preferred embodiment of the invention the spring 136 is formed from conventional 17-7PH steel and is designed to require about eighty pounds (36.4 kg) to compress the spring about 0.200 inches (5.08 mm), i.e., $L_3-L_4$ is 0.200 inches (5.08 mm). Accordingly, the links 110 are sized so that in the door closed position they are each predeterminedly designed to compress this amount to compensate for manufacturing tolerances to eliminate rigging. This amount of over travel is preferably built into the bypass valve system 54 to ensure that all of the doors 88 are fully closed in the closed position for accommodating manufacturing tolerances up to this amount.

As illustrated for example in FIG. 7, the ring 94 also includes a plurality of conventional, circumferentially spaced, U-shaped first clevises 146 extending from the ring second side surface 94c in a downstream facing direction toward the doors 88. Each of the first clevises 146 has a pair of conventional, coaxially aligned apertures through which a conventional bolt is positioned. Each of the doors 88 includes a conventional, single U-shaped second clevis 148, each having conventional, coaxially aligned apertures for similarly receiving a conventional bolt. Each of the space links 110 is disposed between a respective pair of the first and second clevises 146 and 148 so that the uniball central bores 144 are aligned with the clevis apertures, and a respective conventional bolt is disposed through the clevis apertures and the uniball central bores for pivotally connecting each of the space links 110 to the ring 94 and a respective door 88. In a preferred embodiment, the second clevis 148 is disposed on the door 88 adjacent to the door downstream end 108 for providing a maximum amount of closing torque to the door 88. Also in the preferred embodiment, the second clevis 148 is centrally disposed in the door 88 for uniformly spreading the closing torque to the door 88 for uniform rotation about the hinge 106. In other embodiments of the invention, the second clevis 148 may be disposed at other positions on the door 88 and there may be more than one second clevis, and corresponding space link 110, for each door as desired.

Referring for example to FIGS. 6, 13, 14 and 15, preferred details of each of the doors 88 are illustrated. The door 88 includes an inner surface 150 which is preferably arcuate, or concave, relative to the frame centerline axis 96 so that the door inner surface 150 may be positioned coextensive with the intermediate casing 58 for providing a smooth boundary of the second flow channel 72 when the doors 88 are in the open position. As illustrated in FIG. 5, for example, the door inner surface 150 is coextensive with inner surfaces 58a to eliminate any abrupt changes in the surface for providing a smooth surface for channeling the bypass airflow 82 through the second channel 72. In the preferred embodiment, the door inner surface 150 is aerodynamically contoured or blended with the inner surface 58a defining the outer surface of the second channel 72 and has a first radius $R_1$ relative to the frame centerline axis 96 at the door upstream end 100, and a second radius $R_2$ relative to the frame centerline axis 96 at the door downstream end 108, both when the door 88 is in the open position. In this exemplary embodiment, since the door 88 in the open position illustrated in FIG. 6 is inclined radially outwardly, $R_2$ is greater than $R_1$ so that the door inner surface 150 may provide a desirable aerodynamic transition from the door upstream end 100 to the door downstream end 108.

Figure 13:
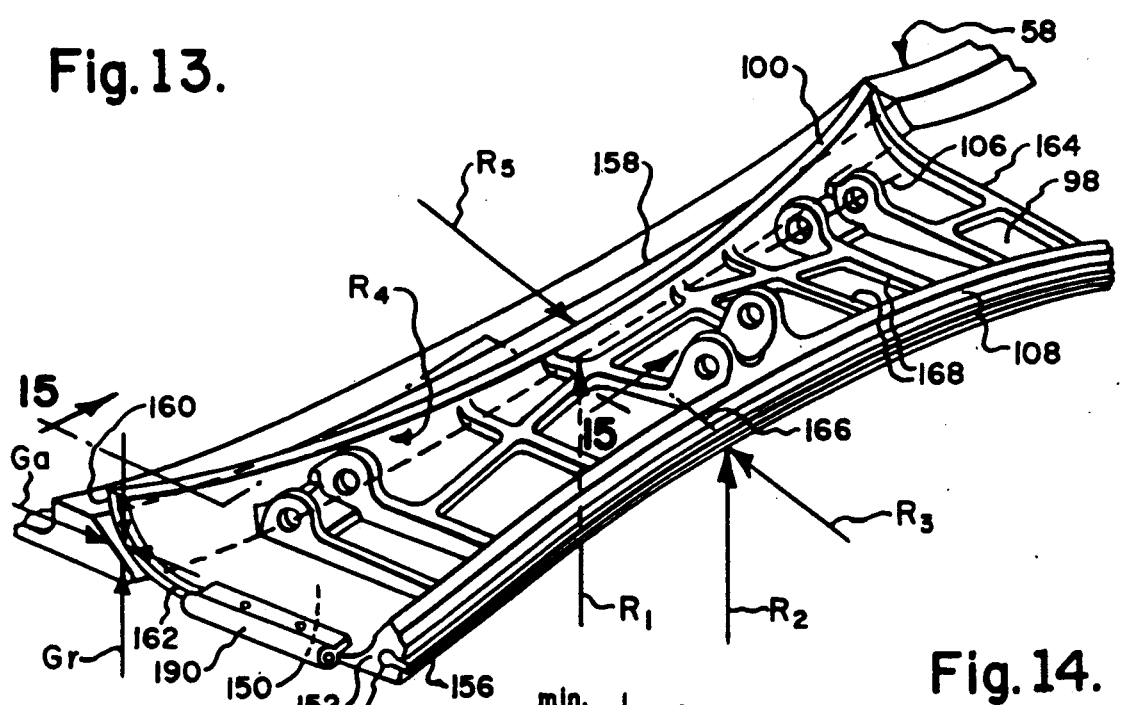
FIG. 13 is a perspective view of one of the bypass valve doors used in the bypass valve system illustrated for example in FIGS. 3 and 4, along with a complementary portion of the frame.

As illustrated for example in FIGS. 6 and 13, the door 88 further includes an arcuate seal seat 152 extending obliquely and outwardly from the door outer surface 98 at the door downstream end 108 which is positionable fully within the cavity 92 when the door 88 is in the open position as shown in solid line in FIG. 6. As shown in dashed line in FIG. 6, when the door is positionable in the closed position, the seal seat 152 is positioned in sealing contact with the splitter 68. The seal seat 152 preferably includes a keyhole-shaped recess 154 which receives an elastomeric seal member 156 conventionally fixedly secured therein, either mechanically or by an adhesive. The seal member 156 extends outwardly from the seal seat 152 for resiliently contacting the splitter 68 for creating a seal therewith when the door 88 is in the closed position. In a preferred embodiment, the seal 156 is made from commercially available KALREZ made by E. I. DuPont Company which is effective at temperatures up to about 400° C. In another embodiment, the seals 156 may be eliminated where leakage is acceptable.

Figure 14:
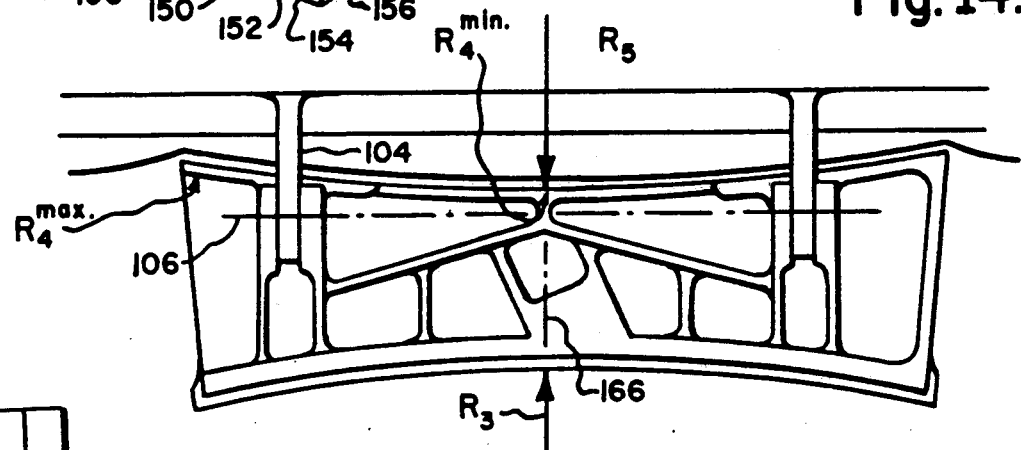
FIG. 14 is a partly schematic, top view of one of the bypass valve doors similar to the view illustrated in FIG. 7, for example, with the space link being removed for clarity.
Figure 15:
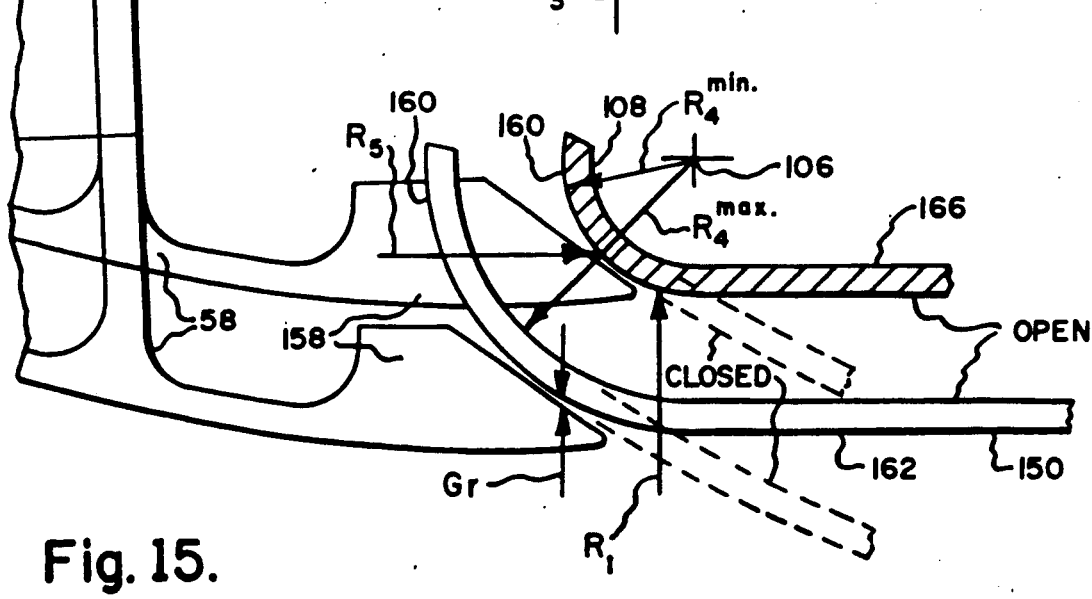
FIG. 15 is a compound, transverse, sectional view of an upstream end portion of one of the bypass valve doors and the complementary frame taken along line 15—15 in FIG. 13.

As illustrated for example in FIGS. 6, 13, and 14, the seal seat 152 has a third radius $R_3$ relative to the frame centerline axis 96 which is generally equal to the radius ($R_3$) of the splitter 68 at the point where the seal seat 152 contacts the splitter 68 when the seal seat 152 is positioned adjacent to the splitter 68 for forming a first seal therewith when the door is in the closed position. It should be noted that the door downstream end 108 has a compound curvature with the seal seat 152 having the radius $R_3$ to match the splitter 68 in the door closed position, while the door downstream end 108 at the door inner surface 150 has the second radius $R_2$ when the door 88 is in the open position for matching the radius of the flow channel 72 for ensuring smooth airflow.

The door generally has an hourglass profile, for example, as illustrated in FIGS. 13 and 14, for providing a second seal between the door upstream end 100 and a complementary seal portion 158 formed integrally with the intermediate casing 58. The hourglass profile also provides the first seal between the door downstream end 108, or more specifically, the seal seat 152, with the splitter 68 when the door is in the closed position as described above. The second seal at the upstream end 100 is effective for reducing airflow leakage during movement of the door 88 between the open and the closed position.

Since the hinge axis 106 is spaced outwardly from the door outer surface 98 at the door upstream end 100, the door upstream end 100 and the intermediate casing seal portion 158 have preferred profiles for maintaining a uniform first seal. More specifically, each of the doors 88 includes an arcuate leading edge 160 as illustrated for example in FIGS. 13 and 15, which extends between first and second door side surfaces 162 and 164. The leading edge 160 has a radius $R_4$ relative to the hinge axis 106 with the leading edge radius $R_4$ having a minimum value $R_4^{min}$ at a door center section 166, and maximum values $R_4^{max}$ at the door first and second side surfaces 162 and 164. This is more readily illustrated in FIG. 15 which shows the leading edge 160 at the first side surface 162 and at the center section 166. Referring to both FIGS. 13 and 15, it will be noted that when the door 88 is in its open position, the leading edge 160 is also curved at the radius $R_1$ relative to the centerline axis 96 for matching the generally equal diameter ($R_1$) at the seal portion 158. Accordingly, the door 88 is preferably arcuate and the leading edge 160 is curved at the radius $R_1$ relative to the frame centerline axis 96 when the door 88 is in the open position. The leading edge 160 then forms the second seal with the intermediate casing seal portion 158, which second seal is simply a generally uniform and relatively small gap between the leading edge 160 and the seal portion 158 for minimizing the amount of bypass air which may flow therebetween. The gap has an axial portion $G_a$ and a radial portion $G_r$. The radial gap $G_r$ and axial gap $G_a$ are generally uniform along the circumference of the door leading edge 160 at all positions of the door 88 from the open to closed positions.

As illustrated, for example in FIG. 14, the preferably hourglass shape of the door 88 is provided also so that the radial gap $G_r$ and axial gap $G_a$ between the leading edge 160 and the seal portion 158 may be maintained relatively small for reducing leakage therethrough. The leading edge 160 portion of the hourglass profile of the door 88 is defined by a radius $R_5$ of the leading edge in a plane generally parallel to the door inner surface 150 when the door is in the open position, for example. Just as the door downstream end 108 has compound radii, the door upstream end 100 at the door leading edge 160 also has compound radii. As described above the leading edge has an arcuate profile $R_4$ relative to the hinge axis 106 having the values ranging from $R_4^{min}$ to $R_4^{max}$. Also the leading edge 160 at the door inner surface 150 is formed at the radius $R_1$ in the door open position and the complementary seal portion 158 is also formed at the radius $R_1$ for forming the generally uniform radial gap $G_r$. Yet further, the leading edge 160 is also formed at the radius $R_5$ for maintaining the generally uniform axial gap $G_a$, and the complementary seal portion 158 is also formed with the radius $R_5$.

Accordingly, the door hinge axis 106 is preferably spaced from the intermediate casing seal portion 158 for spacing the leading edge 160 therefrom to define the axial and radial gaps $G_a$ and $G_r$ which are generally uniform along the leading edge 160 as the door 88 is positioned between the open and closed positions.

In order to reduce the complexity and weight of the bypass valve system 54 as above described, the single rotary actuator 120 is preferred and, the ring 94 is preferably made with a U-shaped profile. Furthermore, each of the doors 88 is relatively thin and includes a plurality of conventional stiffening ribs 168 spaced over the door outer surface 98 as illustrated for example in FIG. 13. The elements of the bypass valve system 54 may be formed from suitable metals, but titanium is preferred for reducing weight for aircraft flight applications. For example, the bypass doors 88 may be made from titanium, Ti 6-2-4-2, material and the ring 94 may be made from titanium, Ti 6-4 material. The bypass valve system 54 is relatively compact and may be easily sized for fitting in the available space formed by the cavity 92 with the rotary actuator 120 being disposed outside the outer casing 90. Furthermore, the doors 88 may be opened and closed within a range of about 45° by relatively little rotation of the ring 94, which in the preferred embodiment is only about 3°. Furthermore, the preferred hourglass shape of the door 88 as above described provides for a relatively smooth boundary in the second flow channel 72 when the door is in the open position while additionally providing for effective and uniform seals between the door upstream end 100 and its complementary seal portion 158, and the door downstream end 108, at the seal seat 152, and the splitter 68 when the door is in the closed position. Furthermore the seal at the door leading edge 160 also includes generally uniform radial and axial gaps $G_r$ and $G_a$ during the entire movement of the door between the open and closed positions.

Illustrated in FIGS. 16–18 is another embodiment of the invention which is essentially identical to the first embodiment described above except for an alternate embodiment of the rotating means 118. More specifically, instead of using a rotary actuator 120, the rotating means 118 includes first and second linear actuators 170 disposed 180° apart, fixedly joined to the outer casing 90 and each having an extendable actuator rod 172. The actuators 170 are conventional servovalves. A pair of conventional bellcranks 174 are operatively connected to respective ones of the actuators 170. Each bellcrank 174 includes a rotatable transfer rod 176 extending through an aperture in the outer casing 90 and having first and second ends 176a and 176b. A first lever 178 has a first end 178a pivotally connected to a respective one of the actuators 170 by a conventional bolt for example, and also includes a second end 178b fixedly connected to the transfer rod first end 176a by a conventional nut for example. A second lever 180 has a first end 180a fixedly connected to the transfer rod second end 176b, which is preferably formed integrally therewith, and also includes a second end 180b having a conventional roller bearing 182 pivotally secured thereto by a conventional bolt for example.

The actuation ring 94 in this embodiment of the invention, includes a plurality of circumferentially spaced first slots 184 disposed therein, in which first slots 184 are received respective ones of the roller bearings 182. The bell cranks 174 are sized and positioned for rotating the actuation ring 94 for positioning the doors 88 between the open and closed positions.

More specifically, the bellcrank first and second levers 178 and 180 are disposed about 90° relative to each other and the second lever 180 is disposable relative to the longitudinal centerline axis 96 of the frame 58 within a range of about +30° and −30° for positioning the doors between the closed and open positions. In this way, a maximum amount of rotation of the ring 94 may be obtained with a minimum amount of rotation of the second levers 180. The second lever 180 is preferably initially positioned about 30° relative to one side of the longitudinal axis 96 corresponding to the open position of the doors 88 and is rotated to 30° on the opposite side relative to the longitudinal axis 96 corresponding to the door closed position.

In order to allow the ring 94 to rotate while restraining axial translation thereof, the rotating means in this embodiment further includes a plurality of equidistantly circumferentially spaced third roller bearings 186 pivotally connected to the outer casing 90 in the cavity 92, for example by bolting to the outer casing 90. The actuation ring 94 further includes a plurality of elongate circumferentially spaced second slots 188, as illustrated in FIG. 18, which receive therein respective ones of the third roller bearings 186. The second slots 188 are circumferentially elongate for guiding the third roller bearings 186 for allowing the ring 94 to rotate without axial translation of the ring 94.

Since the second lever 180, as illustrated in FIG. 17, rotates, its second end 180b moves in a circumferential direction as well as partly in an axial direction. In order to accommodate this axial component, the first slots 184 are preferably elongate in the axial direction parallel to the frame longitudinal axis 96 to allow the second roller bearing 182 joined to the second lever second end 180b to move axially within the first slots 184. In this manner, the second lever 180 imparts a force in the circumferential direction for rotating the ring 94 while axial displacement of the second roller bearing 182 is accommodated in the first slot 184 to prevent the second roller bearings 182 from imparting axial forces on the ring 94.

Lastly, in order to reduce leakage of the bypass airflow 82 between adjacent ones of the doors 88, an elongate flap seal 190, as illustrated for example in FIGS. 4 and 13, is provided. The flap seal 190 may be disposed on either, or both, door side surfaces 162 and 164 and in the preferred embodiment it is disposed on only the door first side surface 162. The flap seal 190 includes a first side 190a which is fixedly attached to the door outer surface 98 at the first side surface 162, for example by riveting. The flap seal 190 further includes a second, integral side 190b which extends outwardly from the door first side surface 162 for sealing against a second side surface 164 of an adjacent door 88, as illustrated for example in FIG. 4. Accordingly, when the doors 88 are positioned in the closed position, the flap seal 190 is compressed against and contacts the adjacent door 88 at the second side surface 164 for providing a seal therewith. In a preferred embodiment, the seal 190 may comprise Fluoroloy K surrounding a partially flattened tubular spring member having strap coils obtained from the Fluorocarbon Company. The flap seal 190 may also be formed from KALREZ manufactured by Dupont. In yet another embodiment, the seals 190 may be eliminated where leakage is acceptable in a particular design.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly what is desired to be secured by Letters Patent of the United States is the invention as defined and differentiated in the following claims:

We claim:

1. A bypass valve system for controlling fluid flow in a gas turbine engine comprising:
    an annular frame including an outer casing, an intermediate casing spaced from said outer casing to define a cavity, said intermediate casing including an annular opening therein, and an inner casing spaced from said intermediate casing to define a first channel for channeling fluid flow;
    a plurality of circumferentially juxtaposed bypass valve doors disposed in said annular opening, each of said valve doors having an inner surface for facing said fluid, an outer surface, a first end pivotally connected to said frame, and a second end, said doors being positionable in a first position generally parallel to said intermediate casing, and in a second position generally inclined from said intermediate casing;
    an annular actuation ring disposed in said frame cavity;
    a plurality of space links, each having a first end pivotally connected to said ring, a second end pivotally connected to a respective one of said doors, and a longitudinal axis extending from said first to second ends; and
    means for rotating said actuation ring between a ring first position wherein each said link longitudinal axis has a first inclination angle and said door is in said door first position, and a ring second position wherein said link longitudinal axis has a second inclination angle less than said first inclination angle so that said link pivots said door about said door first end to position said door in said door second position.

2. A bypass valve system according to claim 1 wherein said frame further includes:
    a flow splitter disposed between said intermediate and inner casings to define with said intermediate casing a second channel and to define with said inner casing a third channel, said second and third channels being in flow communication with said first channel;
    said door inner surfaces facing said splitter in said door first position; and wherein said door first position is an open position allowing substantially unobstructed fluid flow from said first channel to said second channel, and said door second position is a closed position wherein said door second end is disposed adjacent to said splitter for substantially blocking fluid flow from said first channel to said second channel.

3. A bypass valve system according to claim 2 wherein said ring, space links and doors are sized and positioned so that about 3° of rotation of said ring causes about 45° of rotation of said doors from said open to closed positions.

4. A bypass valve system according to claim 2 wherein said rotating means comprises:
   a rotary actuator fixedly secured to an outer surface of said outer casing and having a rotatable actuator rod extending through said outer casing into said cavity;
   a crankarm having a first end fixedly connected to said actuator rod for rotation therewith and a second end pivotally connected to said ring; and
   wherein said actuator is effective for rotating said rod and crankarm for rotating said ring between said ring first and second positions.

5. A bypass valve system according to claim 4 wherein said rotating means further includes:
   a roller bearing pivotally connected to said crankarm second end and having an outer diameter;
   said ring including a U-shaped slot extending generally parallel to said crankarm second end and having a width complementary to said roller bearing outer diameter; and
   wherein said roller bearing is disposed in said slot so that upon rotation of said crankarm said roller bearing imparts a force to said ring through said slot in a circumferential direction for rotating said ring.

6. A bypass valve system according to claim 4 wherein said rotating means further includes said ring being rotatably slideably disposed in said frame and axially restrained for preventing translation of said ring.

7. A bypass valve system according to claim 6 wherein:
   said ring includes a radially outer surface, a first side surface, and a second side surface;
   said frame further includes a first flange fixedly connected to said outer casing in said cavity, and a plurality of circumferentially spaced second flanges fixedly connected to said outer casing in said cavity and spaced from said first flange; and
   said rotating means further includes said ring being sized so that said ring is positioned between said first and second flanges adjacent to said outer casing for allowing rotation of said ring and restraining translation of said ring.

8. A bypass valve system according to claim 7 wherein said rotating means further includes a low friction material disposed between said ring and at least one of said first and second flanges and said outer casing for reducing friction against said ring.

9. A bypass valve system according to claim 8 wherein said low friction material includes a plurality of circumferentially spaced first rub buttons attached to said ring first surface for contacting said frame first flange, a plurality of circumferentially spaced second rub buttons attached to said ring second surface for contacting said frame second flanges, and a plurality of third rub buttons attached to said ring outer surface for contacting said outer casing.

10. A bypass valve system according to claim 9 wherein said actuation ring has a generally U-shaped cross section.

11. A bypass valve system according to claim 2 wherein each of said space links is compressible, and when said doors are in said closed positions at least one of said space links is compressed between said ring and a respective one of said doors for ensuring that said closed position is fully closed.

12. A bypass valve system according to claim 11 wherein each of said space links includes a male end, a female end, and a compression spring disposed therebetween so that movement of said male end relative to and toward said female end compresses said spring.

13. A bypass valve system according to claim 12 wherein said space link has an uncompressed first position and is unextendable in said first position, and is compressible from said first position to a compressed second position.

14. A bypass valve system according to claim 13 wherein said space link further includes:
   a base plate fixedly attached to said male end and said spring is positioned between said base plate and said female end so that movement of said base plate relative to said female end compresses said spring;
   a retention cap fixedly attached to said female end and having a central opening disposed around said male cap; and
   said base plate is positioned between said cap central opening and said female end so that said space link is unextendable when said base plate contacts said retention cap.

15. A bypass valve system according to claim 2 wherein said space link first and second ends each includes a rotatable uniball having a central bore for being connected to said actuation ring and said door, said uniball being pivotal over a range of about 52°.

16. A bypass valve system according to claim 15 wherein said ring includes a plurality of first U-shaped clevises each having coaxially aligned apertures; said doors each include a second U-shaped clevis having coaxially aligned apertures, and each of said space links is disposed between a respective pair of said first and second clevises so that said uniball central bores are aligned with said clevis apertures; and a respective bolt is disposed through said clevis apertures and said uniball central bores for pivotally connecting each of said space links to said ring and a respective door.

17. A bypass valve system according to claim 16 wherein said second clevis is disposed on said door adjacent to said door downstream end.

18. A bypass valve system according to claim 17 wherein said second clevis is centrally disposed in said door.

19. A bypass valve system according to claim 2 wherein said frame includes a longitudinal centerline axis and said door inner surface is arcuate relative to said centerline axis for being coextensive with said intermediate casing for providing a smooth boundary of said second flow channel when said doors are in said open position.

20. A bypass valve system according to claim 19 wherein said door inner surface is concave.

21. A bypass valve system according to claim 19 wherein said door inner surface is concave and has a first radius relative to said centerline axis at said door first end and a second radius relative to said centerline axis at said door second end when said door is in said open position, said first and second radii being different.

22. A bypass valve system according to claim 21 wherein said door further includes a seal seat extending obliquely from said door second end and positionable within said cavity when said door is in said open position and positionable in sealing contact with said splitter when said door is in said closed position.

23. A bypass valve system according to claim 22 wherein said seal seat has a third radius relative to said centerline axis generally equal to a radius of said splitter when said seal seat is positioned adjacent to said splitter for forming a first seal therewith when said door is in said closed position.

24. A bypass valve system according to claim 22 wherein said seal seat includes a recess and a seal member fixedly secured therein which extends outwardly from said seal seat for contacting said splitter for creating a seal therewith when said door is in said closed position.

25. A bypass valve system according to claim 19 wherein said door has a generally hourglass profile for providing a first seal between said door second end and said splitter when said door is in said closed position and a second seal between said door first end and a complementary seal portion of said intermediate casing during movement of said door between said open and closed positions.

26. A bypass valve system according to claim 25 wherein said door further includes:
a first side surface;
a second side surface;
a center section spaced equidistantly between said first and second side surfaces;
a hinge axis spaced outwardly from said door outer surface at said door first end about which hinge axis said door is pivotable; and
an arcuate leading edge extending between said first and second side surfaces and having a radius relative to said hinge axis, said leading edge radius having a minimum value at said door center section and maximum values at said door first and second side surfaces, and said leading edge forming said second seal with said intermediate casing seal portion.

27. A bypass valve system according to claim 26 wherein said door further includes two spaced hinges on said outer surface at said door second end pivotally joining said door to said frame, said two hinges defining said hinge axis.

28. A bypass valve system according to claim 26 wherein said leading edge is disposed adjacent to said complementary intermediate casing seal portion at a first radius relative to said centerline axis for maintaining a generally uniform radial gap between said leading edge and said intermediate casing seal portion at least when said door is in said open position.

29. A bypass valve system according to claim 28 wherein said leading edge is disposed adjacent to said complementary intermediate casing seal portion at a fifth radius in a plane generally parallel to said door inner surface for maintaining a generally uniform axial gap between said leading edge and said intermediate casing seal portion from said door open to closed positions.

30. A bypass valve system according to claim 29 wherein said hinge axis is spaced from said intermediate casing seal portion to define said axial and radial gaps which are generally uniform along said leading edge as said door is positioned between said open and closed positions.

31. A bypass valve assembly according to claim 29 wherein said door further includes a seal seat extending obliquely from said door second end and positionable within said cavity when said door is in said open position and positionable in sealing contact with said splitter when said door is in said closed position.

32. A bypass valve system according to claim 31 wherein said seal seat has a third radius relative to said centerline axis generally equal to a radius of said splitter when said seal seat is positioned adjacent to said splitter for forming a first seal therewith when said door is in said closed position.

33. A bypass valve system according to claim 32 wherein said seal seat includes a recess and a seal member fixedly secured therein which extends outwardly from said seal seat for contacting said splitter for creating a seal therewith when said door is in said closed position.

34. A bypass valve system according to claim 2 wherein said rotating means comprises:
first and second linear actuators fixedly joined to said outer casing and having extendable actuator rods;
a pair of bellcranks, each including:
a rotatable transfer rod extending through an aperture in said outer casing and having first and second ends;
a first lever having a first end pivotally connected to a respective one of said linear actuators, and a second end fixedly connected to said transfer rod first end; and
a second lever having a first end fixedly connected to said transfer rod second end, and a second end having a second roller bearing pivotally secured thereto;
said actuation ring including a plurality of circumferentially spaced slots disposed therein receiving therein a respective one of said roller bearings; and
said bellcranks being sized and positioned for rotating said actuation ring for positioning said doors between said open and closed positions.

35. A bypass valve system according to claim 34 wherein said bellcrank first and second levers are disposed about 90° relative to each other and said second lever is disposable relative to a longitudinal centerline axis of said frame within a range of about +30° and −30° for positioning said doors between said closed and open positions.

36. A bypass valve system according to claim 34 wherein said rotating means further includes:
a plurality of circumferentially spaced third roller bearings pivotally connected to said outer casing;
said actuation rings further having a plurality of circumferentially spaced slots therein each receiving a respective one of said third roller bearings, said slots being circumferentially elongate for guiding said third roller bearings therein for rotating said ring without translation of said ring.

37. A bypass valve system according to claim 2 further including a flap seal fixedly secured to a side surface of one of said doors which is effective for providing a seal with an adjacent side surface of an adjacent bypass door when said door is in said closed position.

* * * * *